United States Patent [19]

Kobayashi et al.

[11] Patent Number: 4,460,633
[45] Date of Patent: Jul. 17, 1984

[54] NON-WOVEN REINFORCEMENT FOR COMPOSITE

[75] Inventors: Hiroyasu Kobayashi, Suita; Akihisa Inoue, Hirakata; Katsushi Tsujii, Amagasaki, all of Japan

[73] Assignee: Kurashiki Boseki Kabushiki Kaisha, Jurashiki, Japan

[21] Appl. No.: 449,800

[22] Filed: Dec. 14, 1982

[30] Foreign Application Priority Data

Dec. 16, 1981 [JP] Japan .................................. 56/203870
Nov. 5, 1982 [JP] Japan .................................. 57/194975

[51] Int. Cl.³ .............................................. B32B 5/12
[52] U.S. Cl. .................................... 428/110; 428/105; 428/109; 428/218; 428/408; 428/902; 428/297
[58] Field of Search ............... 428/105, 107, 108, 109, 428/110, 113, 114, 257, 258, 259, 360, 367, 408, 902, 218, 297

[56] References Cited
U.S. PATENT DOCUMENTS 3,819,461  6/1974  Saffadi ................................ 428/902
3,953,641  4/1976  Marquis .............................. 428/902
3,983,282  9/1976  Seemann ............................ 428/902
4,103,055  7/1978  Levy .................................. 428/902
4,320,160  3/1982  Nishimura et al. ................ 428/107
4,360,555 11/1982  Bascom et al. .................... 428/108

Primary Examiner—James J. Bell
Attorney, Agent, or Firm—Lawrence Rosen

[57] ABSTRACT

The present invention provides a non-woven reinforcements for resinous composite. The reinforcements are constructed with warps consisting of non-twist yarns or soft twist yarns of multi-filament having a high strength and a high modulus on one or both sides of wefts of non-twist yarns of soft twist yarns containing adhesive agent, in which the warps and the wefts are bonded at intersections thereof.

As the reinforcement of the present invention has no flexure different from a woven fabric, fiber's physical property such as a high strength, a high modulus and the like is reflected faultlessly on the composite using the reinforcement.

In the reinforcement warp is not substantially restrained, so that matrix resin can be impregnated sufficiently into the reinforcement.

Further, because the warps and wefts are bonded at intersections by adhesion, the reinforcement is much easier to be handled without deformation or falling off especially after cutting than the case of a woven fabric.

9 Claims, 4 Drawing Figures

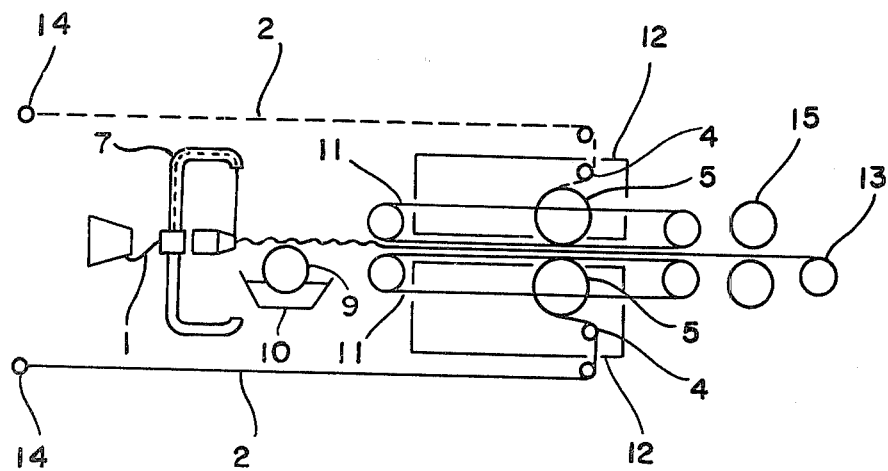
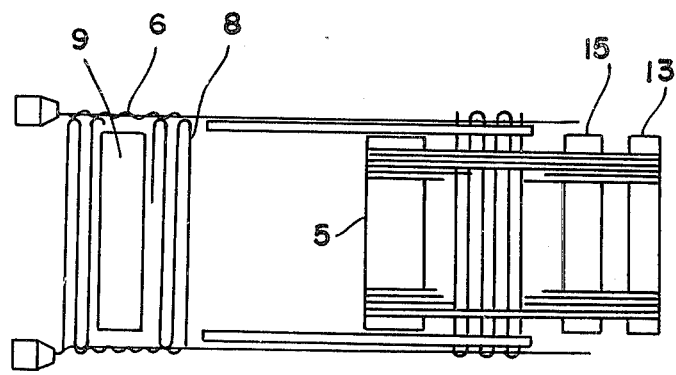

NON-WOVEN REINFORCEMENT FOR COMPOSITE

BACKGROUND OF THE INVENTION

As a reinforcement for composite, a woven fabric has been used in most cases, but the fabric reinforcement has a considerably low reinforcing effect in comparison with a reinforcement having no flexed warp (for example, unidirectional prepreg). The warps are flexed above and below wefts at weaving points, so that a force parallel to the face of the fabric is sustained at angled warps.

Further, woven fabric is restricted in densities of warp and weft. Production of a woven fabric having a density larger than a specific density is difficult, because the volume of the fiber is restricted by the weaving of warp and weft, and the fabric is liable to be napped by mutual abrasion of warps. Furthermore, as carbon fibers, aromatic polyamide fibers and the like are liable to slip, the production of the fabric having a lower density than a specific density is difficult. Therefore, for keeping a giving interval of the warp, other fiber warp is necessary to be woven into the interval, which lowers the density of the carbon fibers or aromatic polyamide fibers in the woven fabric.

A unidirectional prepreg having an arrangement of a large number of fibers has been known as a reinforcer, but the prepreg splits easily by the reason of their week adhesive strength among fibers arranged in unidirection. Therefore, the prepreg must carefully be handled, and preserved at a comparably low temperature, and shelf life is about 2 to 6 months at a temperature of 10° to 15° C. That is, it has a problems about preserving and marketing.

Processes for bonding warps and wefts to make non-woven fablic are disclosed in Japanese Patent Kokai No. 40505/1971, Japanese Patent Kokai No. 160561/1975, Japanese Patent Publication No. 34026/1976, Japanese Patent Publication No. 23520/1968, and Japanese Patent Publication No. 22792/1969, but none of them discloses any reinforcement for resinous composite. Particularly, in the former three prior arts adhesive agents are applied to warp but not weft for bonding both, which will prevent a matrix resin to permiate into the filaments if they are used as reinforcement. Therefore, the non-woven fablics disclosed in the above literatures are not suitable for the application as reinforcement for resinous composite. Besides, latter two prior arts disclose application of adhesive agent to weft, but suggest neither the use of reinforcing fibers such as carbon fibers, aromatic polyamide fibers and graphite fibers nor application as reinforcement for resinous composite.

Japanese Utility Model Publication No. 1747/1981 discloses production of reinforcement for resinous composite made of reinforcing fibers such as carbon fiber bundles, in which the fiber bundles are arranged parallelly and treated with adhesive agent to prevent the fiber bundles from loosing, and obtained sheet is fasten with molten synthetic fibers on the both sides of the reinforcing fibers. Defect of the above production is that even application of small amount of adhesive agent to the fiber bundles is extremely difficult industrially. Further, the application of adhesive agent to warps i.e. reinforcing fibers, inhibits impregnation of matrix resin into the reinforcement to frequently cause the generation of voids which deteriorate reinforcing effect.

SUMMARY OF THE INVENTION

In accordance with the present invention, a non-woven reinforcement for resinous composite is produced. The reinforcement is constructed with warps consisting of non-twist yarns or soft twist yarns of multi-filament having a high strength and a high modulus on both sides of wefts of non-twist yarns or soft twist yarns containing adhesive agent, in which the warps and wefts are bonded at intersections of them. This is a first embodiment of the present invention. When a matrix resin is applied to the reinforcement by the hand lay-up method, it is feared that the warps on the side of being scrubbed may be taken off. To avoid this disadvantage there should be free of warps on the side where scrubbing is made. In other words, warps are bonded to the wefts only on one side of the wefts. This is a second embodiment of the present invention.

DESCRIPTION OF DRAWINGS

FIGS. 3 and 4 show schematically processes for the productions of the reinforcements of the present invention.

DETAILED DESCRIPTION OF THE INVENTION

Figure 1:
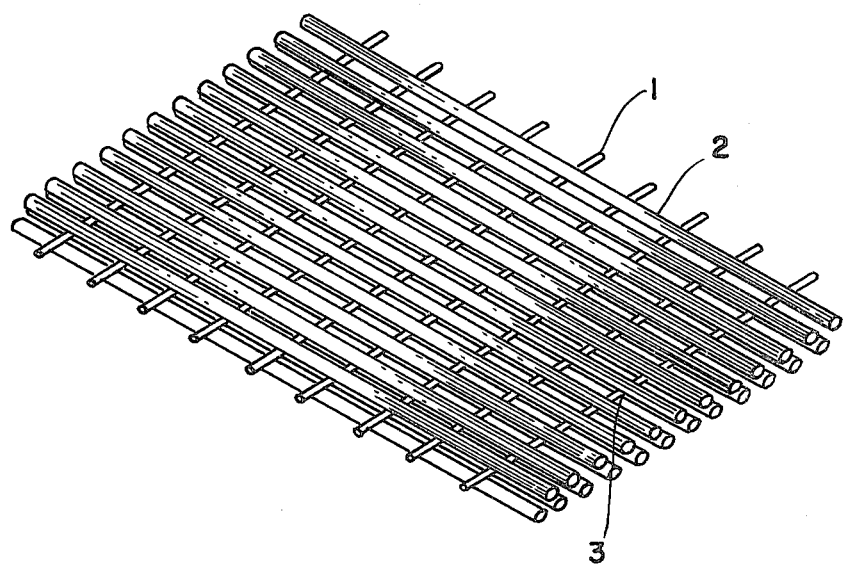
FIGS. 1 and 2 are schematic illustration of the first and the second embodiments of the present invention respectively.

At first, present invention provides a non-woven reinforcement for resinous composites, in which bundles of non-twist yarns or soft twist yarns are used as weft, adhesive agent is impregnated into the wefts, and warp bundles are piled up on the both side of the wefts to fasten the warps with the adhesive agent impregnated into the weft alone.

According to the present invention, the deterioration of strength of warp by weaving (repeated flexing of fiber) is prevented; the impregnation of the matrix resin into the warp becomes easy and control of the warp density in a wide range is enabled.

The present invention relates to non-woven reinforcement for resinous composite which comprises piling bundles of non-twist yarns or soft twist yarns having a high strength, a high modulus as warps on both side of bundles of non-twist yarns or soft twist yarns as wefts, and bonding the warps and wefts on points of intersections.

The warp of the present invention includes multifilaments having a high strength, a high modulus such as carbon fiber, graphite fiber, glass fiber, aromatic polyamide fiber (Kevlar fiber) and the like. Fineness of the warp is preferably about 300 to 30000 denier. In order to prevent the fiber bundles from loosing it is preferable that the warp is twisted slightly, desirably at about 5 to 40 times/m, especially 10 to 20 times/m. Of course, non-twist yarn may be used. Harder twist than 40 times/m not only lowers the strength of the reinforcement, but also the impregnation of the matrix resin becomes deficient, so that the obtained composite is generally weak.

The weft of the reinforcement according to the present invention is not restricted on fiber itself, and is selected from a proper fiber such as glass fiber, polyester fiber, carbon fiber, graphite fiber, aromatic polyamide fiber and the like. Suitable fineness of the weft is from about 100 to 1500 denier. The weft is preferably a non-twist yarn or soft twist yarn. In case of soft twist yarn, the number of twists are desirably not more than 40 times/m, especially not more than 20 times/m. A large number of twists make flattening of weft at intersections difficult, so that it causes a danger to scratch the warp and deteriorates bonding property to warp. Particularly preferable fiber as weft is a glass fiber or an aromatic polyamide fiber.

The adhesive agent is impregnated into the wefts. The intersections of the warps and wefts are fixed by the adhesive agent. Preferable adhesive agent is one having a sufficient adhesive strength to bear up against production, storage and transportation of the reinforcement, having neither stickiness nor blocking and having an enough adhesive property not to separate warps and wefts by the application of matrix resin at the production of the resinous composite.

Preferable adhesive agent is urethane type, especially thermoplastic urethane; polyester, especially thermoplastic polyester, epoxy type, polyamide type, polyacrylic type, vinyl type, and rubber type adhesive agent. Mixtures or compounds thereof may be used.

The amount of the adhesive agent to the weft is preferably 5 to 20 g(solid)/100 g(weft).

As shown in FIG. 1, the warps (2) are piled on both side of the wefts (1) to be bonded at the intersections (3). Preferable density (the number of warp ends/cm) of the warp's arrangement is 1 to 20 ends/cm, whereas the density of the weft's arrangement is preferable 0.5 to 5 ends/cm.

According to the above first embodiment of the present invention, since adhesive agent is not impregnated into the warps, the matrix resin can be permiated into the warps sufficiently and a composite having a high strength can be obtained. Further, as the reinforcement of the present invention is not a woven fablic and so has no flexing of warp, the strength can be improved. Furthermore, as the intersections of the warps and wefts are bonded and then fixed, the reinforcement can be cut freely to be used without untidiness of the warp. Using a carbon fiber, a glass fiber or an aromatic polyamide fiber as weft, the strength in the direction of weft is improved.

In the meanwhile, at the production of a composite reinforced with the above reinforcement by hand lay-up, warps contacting with a roll or a brush have a tendensy to wind on the surface of it to reduce the workability and to disorder the arrangement of the warps, so that the composite is deteriorated in the strength and in the evenness of thickness.

Figure 2:
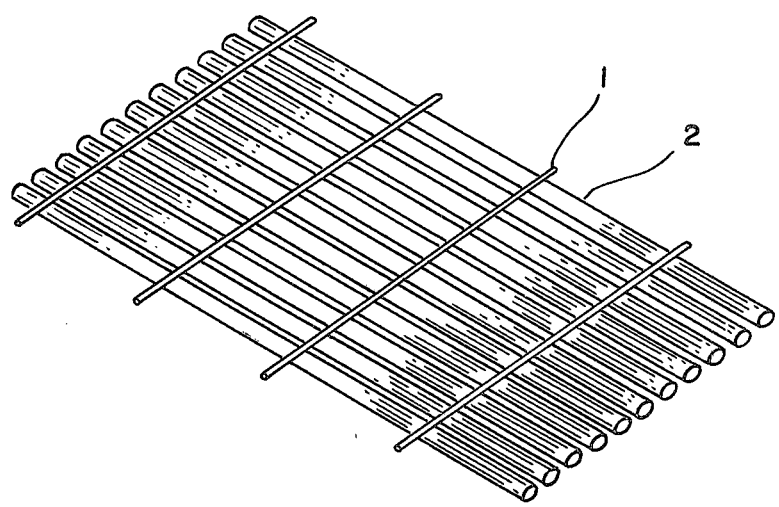

In order to prevent the above problem, the warps are piled on one side of the wefts and the matrix resin is applied by a roll or a brush on the side of wefts. Such a reinforcement having one layer of warp is a second embodiment of the present invention which is shown in the FIG. 2.

The warps used in the second embodiment are not different from the first embodiment in the kind of fiber, fineness, twist, density and the like.

Though the wefts of the second embodiment of the present invention are essentially the same as the first embodiment, the fineness of the fiber used as the weft is preferably 150 to 600 denier. If the fineness is smaller than 150 denier, the strength of the reinforcement in the production or handling and adhesive strength is deficient, whereas larger than 600 denier, smoothness of surface of the reinforcement and the strength of the resinous composite produced using the reinforcement become poor, because the liniality of the warps are reduced by the thick weft at the production of the composite.

The number of the twists of the weft is preferably 0 to 40 times/m. As the weft hardly be flattened at more than 40 times/m, the adhesion with warps is deteriorated and the linear arrangement of the warps is inhibited at the laminating, so that the reinforcing effect lowers.

The present invention is illustrated by the Examples and FIGS. 3 and 4.

EXAMPLE 1

As warp carbon fiber bundles (3600d, the number of filaments: 6000 and, number of twists: 15 times/m) are used. Two layers containing 500 bundles respectively are drawn out from creel stand (14) on the both sides of weft, arranged through grooved roll as 5 ends/cm in each layer, and guided to pressing roll (5) intersecting with weft, in which bundles of each layer are arranged at gaps of bundle files of another layer in the manner that the bundles of both sides do not overlap each other.

As weft (1) glass fiber bundles (600d, the number of filaments: 400, and the number of twists: 20 times/m) are used, coiled on weft supporting device (6) through rotating arm (7). The weft is advanced by the rotation of the weft supporting device (6) to form a sheet having a parallel wefts at interval of 2 ends/cm, and guided to pressing roll (5) of intersection with warp through adhesive agent applying roll (9).

In the meanwhile, selvage yarn (11) is advanced through weft supporting device (6) to support the weft after the weft leaves from the supporting device. As the selvage yarn (11) polyester filament of 1000d is used.

As adhesive agent (10) 10% solution of polyvinyl butyral resin (available from DENKI KAGAKU K.K.) is used. The amount of the adhesive agent attached to the weft is controlled to 12% by weight based on the weft using the adhesive applying roll (9).

The warp and weft bonded by pressing roll (5) are dried in heating oven (12), and coiled up by take-up roll (13) after excess weft and selvage are cut off (FIG. 1). The rate of warp is 5 m/minute.

The resultant reinforcement has a uniform arrangement in weft and also in warp and no slackening of the fiber. The reinforcement is constructed with 10 bundles of carbon fibers/cm in warp and 2 bundles of glass fibers/cm in weft, the weights of the reinforcement are 415 g/m$^2$, and the weights of carbon fibers are 400 g/m$^2$ (96.4%).

Preparation of composite using reinforcement of Example 1

Commercially available unsaturated polyester "POLYLIGHT FH 123" (available from DAINIPPON INK K.K.) 100 parts and curing agent "PARMEK H" (available from NIPPON YUSHI K.K.) 1.0 part are mixed and impregnated into the reinforcements of Example 1. Three sheets of the reinforcement are laid up in the same direction of the carbon fiber of the warp, held at room temperature for one hour, and postcured at 80° C. for 2 hours to form a laminated composite board of 2 mm thickness.

EXAMPLE 2

A reinforcement is prepared as the same manner as Example 1 excepting using aromatic polyamide fiber bundle (380d, the number of filaments: about 260 and the number of twists: 5 times/m) at the density of 10 ends/cm in each both layers of warps, glass fiber bundles (600d, the number of filaments: 400 and the number of twists: 20 times/m) at the density of 2 ends/cm as weft, and Nylon copolymer (available from TORAY K.K. as CM 8000) at 15% solution, and applying it to weft at the amount of 10 solid percent by weight of the adhesive agent based on the weight of weft.

Preparation of composite using reinforcement of Example 2

EPICOAT 815 (available from YUKA SHELL EPOXY K.K.) 100 parts, and curing agent EPOMATE LX-1N (available from YUKA SHELL EPOXY K.K.) 33 parts are mixed and impregnated into the reinforcement of Example 2 uniformly. Fourteen sheets of the reinforcement are laid in the same direction of the aromatic polyamide of the warp, held at room temperature for one hour, and postcured at 80° C. for 3 hours to form a laminated composite board of 2.5 mm thickness.

EXAMPLE 3

A reinforcement is prepared according to the substantially same manner as Example 1 excepting using aromatic polyamide fiber (380d, the number of filaments: 260 and no-twist bundle) as weft arranged at the interval of 1 end/cm and the same adhesive agent as Example 2, and applying it to weft at the amount of 13 percent solid by weight based on weft.

Preparation of composite using reinforcement of Example 3

EPICOAT 828 (available from YUKA SHELL EPOXY K.K.) as epoxy resin 100 parts and CURESOL 2E4M (available from SHIKOKU FINE CHEMICALS K.K.) as curing agent 2 parts are mixed and impregnated into the reinforcement of Example 3. Five sheets of the impregnated reinforcement are laid in the same direction and held at 80° C. for 100 minutes and postcured at 150° C. for 2 hours to form laminated composite of 2.4 mm thickness.

EXAMPLE 4

A reinforcement is prepared according to the same manner as Example 1 excepting that the warp density are 5 ends/cm, the density of weft is 1 end/cm and the amount of adhesive agent attached to weft is 14 percent solid by weight based on weft.

Preparation of composite using reinforcement of Example 4

The composite is prepared according to the same way as the composite in Example 1, excepting using of six sheets of reinforcement of Example 4. Composites of 2 mm thickness are obtained.

Physical properties of the above laminated composites are shown in Table-1.

TABLE 1

| Strengths | Example numbers | | | |
|---|---|---|---|---|
| | 1 | 2 | 3 | 4 |
| Tensile strength (kg/mm$^2$) | 98.4 | 86.2 | 146 | 97.0 |
| Tensile modulus (kg/mm$^2$) | 8380 | 4150 | 11100 | 8300 |
| Flexural strength (kg/mm$^2$) | 104 | 42.6 | 142 | 100 |
| Flexural modulus (kg/mm$^2$) | 6400 | 4050 | 10140 | 6200 |
| Compressive strength (kg/mm$^2$) | 37.4 | 19.7 | 55.0 | 37.1 |
| Interlaminar shear strength (kg/mm$^2$) | 7.2 | 5.2 | 8.5 | 6.0 |

TABLE 1-continued

| Strengths | Example numbers | | | |
|---|---|---|---|---|
| | 1 | 2 | 3 | 4 |
| warp content by volume (%) | 35 | 30 | 50 | 35 |

EXAMPLE 5

As warp (2) 250 carbon fiber bundles (3600d, the number of filaments: 6000 and the number of twists: 15 times/m) are drawn out from creel stand (14) below the weft, arranged in the width of 500 mm in the ratio of 5 ends/cm through a grooved roll (4), and guided to pressing roll (5), in which the warp is interconnected with the weft.

As weft (1) glass fiber bundles (300d, the number of filaments: 200, the number of twists: 20 times/m) is coiled on the weft supporting device (6) through rotating arm (7). This weft is advanced by rotation of the weft supporting device (6), to form a sheet having parallel wefts arranged density of 1 weft/cm. Adhesive agent (10) is applied to the sheet by the adhesive agent applying roll (9).

Using 12 weight percent solution of polyvinyl butyral resin (available from DENKI KAGAKU K.K.), the amount of the adhesive agent attached to the weft is controlled to 18 g/100 g weft.

The weft advances by endless belt (11) from the end of the weft supporting device (6), and guided to pressing roll (5) after the adhesive agent is dried and melted in the heating oven (12).

Warps and wefts are bonded by pressing roll, perfectly bonded by cooling pressing roll (15) after leaving endless belt (11) and wound by coiling roll.

The weight of the reinforcement is 207.8 g/m$^2$ and that of the carbon fiber is 200 g/m$^2$ (96.2%).

Preparation of composite using reinforcement of Example 5

Commercially available unsaturated polyester resin "POLYLIGHT HF 123" (available from DAINIPPON INK K.K.) 100 parts, curing agent "PERMEC H" (available from NIPPON YUSHI K.K.) 1.0 part are mixed and impregnated into the reinforcement of Example 5.

The roll having 50 mm diameter, 160 mm length and 1 Kg weight is moved front and rear three times.

When surface where wefts are arranged and bonded on the sheet of carbon fiber bundles is evened and defoamed, disorder of the arrangement of warp is not observed.

Comparing the above, when surface of carbon fiber bundles of sheet where wefts are not arranged and bonded are evened and defoamed, the carbon fibers are adhered on the roll and the arrangement of fibers is disordered.

Six sheets of the reinforcement are laid in the same direction of the carbon fiber of the warp, held at room temperature for one hour, and postcured at 80° C. for 2 hours to form a laminated composite board of 2 mm thickness.

The physical properties of laminated composite are shown in Table-2.

EXAMPLE 6

A reinforcement and a molded composite are prepared according to the same manner as described in Example 5 excepting using a thermoplastic urethane "BATHCOAL V-217" (available from MEISEI KAGAKU K.K.) as adhesive agent at the adhesion amount of 18 g solid/100 g weft. When arranged side of weft is defoamed and evened by roll, disorder of warp arrangement is not observed. A composite of 2 mm thickness using six sheets of Example 6 is obtained.

Physical properties of the laminated composite are shown in Table-2.

EXAMPLE 7

A reinforcement and a molded composite are prepared according to the same way as Example 5, excepting using polyester resin "VYRON 300" (available from TOYO BOSEKI K.K.) as adhesive agent at the amount of 18 g solid/100 g weft. A composite of 2 mm thickness using six sheets of Example 7 is obtained.

When the arranged side of weft is defoamed and evened by roll, disorder of warp arrangement is not observed.

Physical properties of the laminated composite are shown in Table-2.

TABLE 2

| Strength | Example No. | | |
|---|---|---|---|
| | 5 | 6 | 7 |
| Tensile strength (kg/mm$^2$) | 81.6 | 82.3 | 81.6 |
| Tensile modulus (kg/mm$^2$) | 7320 | 7020 | 7110 |
| Flexural strength (kg/mm$^2$) | 106.1 | 105.9 | 105.1 |
| Flexural modulus (kg/mm$^2$) | 7060 | 6460 | 6850 |
| Interlaminar shear strength (kg/mm$^2$) | 6.0 | 7.1 | 6.5 |
| Warp content by volume (%) | 35 | 35 | 35 |

What we claim is:

1. A non-woven reinforcement for composites, which comprises warps on at least one side of wefts bonded at intersections of the warps and the wefts, in which the warps consist of a multi-filament selected from carbon fiber, graphite fiber, glass fiber and aromatic polyamide fiber, have a number of twist of 5 to 40 times/m, and comprise no impregnated adhesive agent, prior to being bonded to said wefts and the wefts have a number of twist of 0 to 40 times/m and comprise adhesive agent.

2. The reinforcement of claim 1, in which the warps are piled on both sides of the weft.

3. The reinforcement of claim 2, in which the warp is from 1 to 20 ends/cm and weft is from 0.5 to 5 in density respectively.

4. The reinforcement of claim 2, in which the fineness of warp is from 300 to 30000 denier.

5. The reinforcement of claim 2, in which the fineness of weft is from 100 to 1500 denier.

6. The reinforcement of claim 1, in which the warps are arranged on one side of weft.

7. The reinforcement of claim 6, in which warp is from 1 to 20 ends/cm and weft is from 0.5 to 5 in a density respectively.

8. The reinforcement of claim 6, in which a fineness of warp is from 300 denier to 30000 denier.

9. The reinforcement of claim 6, in which the fineness of weft is from 150 to 600 denier.

* * * * *

UNITED STATES PATENT AND TRADEMARK OFFICE
CERTIFICATE OF CORRECTION

PATENT NO. : 4,460,633
DATED : July 17, 1984
INVENTOR(S) : Hiroyasu Kobayashi et al.

It is certified that error appears in the above—identified patent and that said Letters Patent is hereby corrected as shown below:

Item [73] cancel "Jurashiki" and substitute --Kurashiki--

Item [57] line 6, cancel "yarns of soft" and substitute --yarns or soft--.

Column 4, line 57, cancel "PARMEK" and substitute --PERMEK--.

Column 6, line 42, cancel "HF 123" and substitute --FH 123--.

Column 6, lines 43-44, cancel "PERMECH" and substitute --PERMEK--.

Signed and Sealed this

Seventh Day of May 1985

[SEAL]

Attest:

DONALD J. QUIGG

*Attesting Officer*  *Acting Commissioner of Patents and Trademarks*